(12) United States Patent
Wengerter et al.

(10) Patent No.: US 8,437,768 B2
(45) Date of Patent: *May 7, 2013

(54) INTERFERENCE BALANCING IN A WIRELESS COMMUNICATION SYSTEM

(75) Inventors: Christian Wengerter, Langen (DE); Alexander Golitschek Edler Von Elbwart, Langen (DE)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/276,089

(22) Filed: Oct. 18, 2011

(65) Prior Publication Data

US 2012/0093108 A1 Apr. 19, 2012

Related U.S. Application Data

(63) Continuation of application No. 10/577,710, filed as application No. PCT/EP2004/012563 on Nov. 5, 2004, now Pat. No. 8,068,845.

(30) Foreign Application Priority Data

Nov. 6, 2003 (EP) .................................... 03025481

(51) Int. Cl.
*H04W 72/00* (2009.01)
(52) U.S. Cl.
USPC ........ 455/453; 455/447; 455/452.2; 455/450; 455/522; 370/329
(58) Field of Classification Search ............. 455/453, 455/447, 450, 452
See application file for complete search history.

(56) References Cited

U.S. PATENT DOCUMENTS

| | | | |
|---|---|---|---|
| 5,341,397 | A | 8/1994 | Gudmundson |
| 5,579,373 | A | 11/1996 | Jang |
| 5,649,292 | A | 7/1997 | Doner |
| 6,047,186 | A | 4/2000 | Yu |
| 7,355,960 | B2 | 4/2008 | Kang |
| 7,412,212 | B2 | 8/2008 | Hottinen |
| 2005/0128993 | A1 | 6/2005 | Yu |

FOREIGN PATENT DOCUMENTS

| | | |
|---|---|---|
| JP | 2003-87192 | 3/2003 |
| JP | 2005-160079 | 6/2005 |

OTHER PUBLICATIONS

PCT International Search Report dated Feb. 18, 2005.
European Search Report dated Apr. 1, 2004.
H. Rohling, et al.; "Performance of an OFDM-TDMA Mobile Communication System," Institute of Telecommunications, Technical University Braunschweig, Braunschwieg, Germany, 1996, pp. 1589-1593, p. 2, Line 19.
Japanese Office Action dated Oct. 25, 2011 with translation.

*Primary Examiner* — David Q Nguyen
(74) *Attorney, Agent, or Firm* — Dickinson Wright PLLC

(57) ABSTRACT

A method for balancing the distribution of interference between radio cells in a wireless communication system including cells in which subcarrier blocks are used for communication, a number of adjacent cells building a cell cluster. A corresponding method is for use in a system using multi beam antennas or multiple antennas. Base stations perform the above method and a communication system includes the base stations. To reduce the large average SIR variations without causing additional SIR estimation, measurement and calculation problem as introduced with power control, subcarrier blocks are grouped into a plurality of subcarrier block sets in each cell of a cell cluster, to determine transmission power levels for each of the cells of the cell cluster, and to assign transmission power levels to the subcarrier block sets.

6 Claims, 13 Drawing Sheets

(a)

(b)

INTERFERENCE BALANCING IN A WIRELESS COMMUNICATION SYSTEM

This is a continuation application of application Ser. No. 10/577,710 filed May 2, 2006, which is a national stage of PCT/EP2004/012563 filed Nov. 5, 2004, which is based on European Application No. 030254817 filed Nov. 6, 2003, the entire contents of each which are incorporated by reference herein.

FIELD OF THE INVENTION

The present invention relates to a method for balancing the distribution of interference between radio cells in a wireless communication system. The system comprises a plurality of radio cells in which a plurality of subcarrier blocks is used for communication, wherein each subcarrier block comprises a plurality of subcarriers. Further, a number of adjacent radio cells build a cell cluster. Moreover, the present invention relates to a corresponding method adapted for use in a system in which radio cells are divided into sectors. Furthermore, the present invention relates to base stations performing the above method as well as a communication system comprising the base stations.

BACKGROUND ART

In modern packet-based cellular mobile communication systems, Dynamic Channel Assignment (DCA) schemes are popular, since they are an efficient tool to increase the (air interface) system throughput. DCA schemes utilize the short term fluctuations (fast fading) of the channel quality of the links between base stations (BS) and mobile stations (MS). In such a system a so-called scheduler (usually part of the base station) tries to assign system resources preferably to mobile stations in favorable channel conditions.

In time domain DCA works on a frame-by-frame basis, where a frame duration is typically in the (sub-)millisecond region. Furthermore—depending on the multiple access scheme—the air interface resources are divided in e.g. code and/or frequency domain.

The following description concentrates on downlink scenarios (BS transmits to MS), however without loss of generality, DCA can also be applied to the uplink (MS transmits to BS). In any case, the scheduler performing the DCA needs to have detailed channel knowledge of the BS-MS links, which is gathered by channel estimation. If the scheduler is located in the network and the measurement is performed in the MS, the channel information is signaled from MS to BS. It is important, that the channel quality is measured on a instantaneous basis in order to reflect the instantaneous received signal power and the instantaneous interference.

In Frequency Division Multiple Access (FDMA) systems, DCA is performed in time-frequency domain, since physical layer channels are defined in frequency domain. Typically, the channel quality varies significantly in frequency domain (frequency selective fading). Hence, depending on the conditions of the channels over all available frequencies and all active mobile stations, the scheduler can assign the channels dynamically at each scheduling instant to specific BS-MS links.

In an OFDMA (Orthogonal Frequency Division Multiple Access) system, the frequency resource is partitioned into narrowband subcarriers, which typically experience flat fading. Here, generally the scheduler dynamically assigns subcarrier blocks (containing M adjacent or separated subcarriers) to a specific MS in order to utilize favorable channel conditions on a link. Example of such a system is known from Rohling et al., "Performance of an OFDM-TDMA mobile communication system", IEEE Proceedings on the Conference on Vehicular Technology (VTC 1996), Atlanta, 1996.

In case of a CDMA (Code Division Multiple Access) the system resources are defined in code domain and, therefore, the scheduler dynamically assigns codes to specific BS-MS links. Note, that in contrast to FDMA, for a given link the channel quality is similar for all resources/codes (fading is not code selective) and, hence, in code domain the DCA is performed with respect to the number of codes to assign to a specific MS and not which codes to assign. The DCA is focused on the time domain scheduling utilizing the fast fading characteristics. HSDPA (High Speed Downlink Packet Access) within the 3GPP ($3^{rd}$ Generation Partnership Project) standard is such a CDMA system employing DCA.

A MC-CDMA (Multi-Carrier CDMA) system can be considered as a combination of CDMA and (O)FDMA. Hence, DCA can be performed as well in code as in frequency domain.

Generally, the DCA throughput efficiency increases with the number of active mobile stations in a cell, since this increases the number of links in good channel conditions and, therefore, increases the probability that a channel in favorable conditions is scheduled (multi-user diversity).

Typically, DCA is combined with link adaptation techniques such as Adaptive Modulation and Coding (AMC) and hybrid Automatic Repeat reQuest (ARQ).

Furthermore, DCA can be combined with power control schemes, where the power assigned to a specific channel (in code, frequency domain) is controlled in order to compensate the channel power variations and/or to support the AMC operation.

Systems without Power Control

As described in the previous section, for efficient DCA operation the scheduler in the BS when assuming a non-power controlled system needs detailed knowledge on the instantaneous quality of all channels over all available subcarrier blocks and all involved BS-MS links.

Considering a DCA OFDMA multi-cell scenario and a frequency re-use factor of 1, the system is typically interference limited. I.e. the channel quality per subcarrier block is primarily defined by the signal (S) to interference (I) ratio (SIR), where the interference is dominated by the intercell-interference (co-channel interference) caused by the transmissions on the respective channel (subcarrier block) in adjacent cells (C denotes the set of adjacent cells):

$$ChannelQuality \approx SIR = \frac{S}{I} \approx \frac{S}{\sum_C I_c} \qquad (1)$$

In case of an OFDMA system with DCA and frequency selective fading, the instantaneous SIR(t) for a given link to a mobile station m varies over the subcarrier blocks b, since both the signal and the interference experience fading:

$$SIR_b^m(t) = \frac{S_b^m(t)}{I_b^m(t)} \approx \frac{S_b^m(t)}{\sum_C (I_b^m(t))_c} \qquad (2)$$

As mentioned earlier, the performance of a system employing DCA and AMC greatly depends on the accuracy of the SIR estimation. Therefore, according to equation (2) the following problems occur:

All values in equation (2) experience fast fading and will change between the point in time of the measurement and the point in time of the actual transmission (after performing DCA and AMC selection), This delay causes inaccurate DCA and AMC operation. The delay even increases, if the measurement is performed at the MS and needs to be fed back by signaling to the BS.

The number of interferers in the denominator depends on the actual usage (allocation) of the subcarrier block in the adjacent cells. I.e. depending on the actual load in the adjacent cells some subcarrier blocks might not be used. Generally, at the point in time of the measurement, the usage of subcarrier block at the point in time of the transmission is unknown in adjacent cells due to the following reasons:

The channel quality measurement is performed based on an outdated interference caused by the subcarrier block allocation (scheduling) in the adjacent cells (measurement for the n-th frame is performed at the (n−k)-th frame, where the subcarrier allocation is most likely different).

Further, there exists the so-called chicken-and-egg allocation problem: In cell A, the subcarrier block allocation and AMC can only be performed after the SIR measurement/calculation in cell A has been performed, which requires knowledge of the subcarrier block allocation in cell B (adjacent cells). However, before the subcarrier block allocation in cell B can be performed the SIR measurement/calculation in cell B needs to be performed, which requires the knowledge of the subcarrier block allocation in cell A.

In case the chicken-and-egg problem may be avoided/solved by e.g. an iterative process, signaling of e.g. the allocation status between base stations would be required.

However, since the scheduling frames are in the millisecond region, the signaling would introduce additional significant delay.

Additionally, without any power control, the average SIR (neglecting fast fading influences) for a BS-MS link strongly depends on the geometry (e.g. distance to BS) of the MS causing the following effects:

With increasing distance between BS and MS, the SIR for the respective links decreases, since the average received signal power decreases and the average received interference power increases. This translates in a significantly lower achievable data rate per subcarrier-block for links to mobile stations in low geometry.

The difference in average SIR can be on the order of tens of dB, which requires a large dynamic range for the AMC scheme definition. This leads to an increased amount of signaling, since the required number of combinations of modulation schemes and code rates increases when keeping the AMC granularity with respect to smaller dynamic ranges.

Compared to power controlled systems, in non-power controlled systems it is more likely that multilevel modulation schemes (e.g. 8-PSK, 16-QAM, 64-QAM, etc) are chosen for links to mobile stations in high geometry. Although, this increases the available throughput for those mobile stations, it can decrease the overall system throughput compared to a system, where the available power is distributed such that only non-multilevel modulation schemes (e.g. QPSK) are used. This is caused by the reduced power efficiency of multilevel modulation schemes.

Further, in contrast to power controlled systems, in non-power controlled systems it is more likely that mobile stations in low geometry cannot receive any data with single transmission attempts, but would need several retransmissions. Therefore, the average number of transmissions (ARQ retransmissions) increases, which in turn increases the transmission delay and feedback signaling, as well as decreasing the bandwidth efficiency.

Data transmission to mobile stations in high geometry is burstier in the time domain, since on average higher modulation and coding schemes can be selected. This results in a burstier subcarrier block allocation. This will make the SIR estimation according to equation (2) more difficult, since the subcarrier block allocation changes more often.

Properties of Power Controlled Systems

DCA and AMC can also be combined with Power Control (PC) schemes. Employing PC the system tries to compensate fluctuations of the received signal power due to the signal path loss, shadowing effects (slow fading) and or fast fading effects. Generally, PC schemes can be classified into two categories: Fast PC and slow PC.

In contrast to systems without PC, for slow PC systems the average SIR does not depend on the geometry of the mobile stations, assuming only slow fading effects and unlimited minimum and maximum transmit power. Hence, the achievable data rates per subcarrier block do not depend on the MS position. Note however, the slow PC can only operate within certain limits (dynamic range of the control commands), i.e. the power compensation might not be sufficient or fast enough for any link.

Fast power control is usually performed jointly with the AMC in order to adapt the transmission rate to short term fluctuations and in order to optimize the overall power usage.

With slow/fast PC the instantaneous SIR estimation/measurement/calculation problem as outlined in the previous sections above, is more severe compared to the non-PC case. That is, the unknown number of interference components of the sum in the denominator equation (2) do not only experience fast fading, but significantly vary in amplitude due to the PC in adjacent cells. I.e. the intercell-interference on a given subcarrier block from a given adjacent cell can vary from frame to frame in tens of dB depending on which MS is scheduled on the respective subcarrier block, since the transmitted power might vary significantly depending primarily on the MS location. This is especially critical, if the interference is dominated by few interferers, since there is no interference averaging effect.

SUMMARY OF THE INVENTION

One object of the present invention to reduce the large average signal to interference ratio (SIR) variations due to the mobile stations (MSs) geometries without causing the additional SIR estimation, measurement and calculation problem as introduced with power control. Hence, the present invention may be especially suited for environments without power control.

The object is solved by the subject matter of the independent claims. The different embodiments of the present invention are subject matters of the dependent claims.

In more detail, the present invention provides a method for balancing the distribution of interference between radio cells in a wireless communication system. The system may comprise a plurality of radio cells in which a plurality of subcarrier blocks is used for communication. Each subcarrier block may comprise a plurality of subcarriers and a number of adjacent radio cells may build a cell cluster. Further, it should be noted that the term "subcarrier block" may also be understood as a (physical layer) channel in a FDM (Frequency Division Multiplex) based communication system, e.g. in case the number of subcarriers of a subcarrier block is equal to one.

According to the method the subcarrier blocks may be grouped into a plurality of subcarrier block sets (SBSs) in each radio cell of the cell cluster. Further, a plurality of transmission power levels may be determined for each of the radio cells of the cell cluster and the plurality of transmission power levels may be assigned to the subcarrier block sets of radio cells of the cell cluster. It is noted that according to this embodiment, the number of transmission power levels and subcarrier block sets are independent of one another, i.e. same do not necessarily have to be of same number.

Further, the radio cells of the cell cluster may each comprise corresponding subcarrier block sets having the same subcarriers.

The plurality of transmission power levels may be assigned to the subcarrier block sets of radio cells of the cell cluster, such that in a single radio cell, there is a mapping of each of the plurality of transmission power levels to a subcarrier block set of the single radio cell, and there is a mapping of each of the plurality of transmission power levels to one of the corresponding subcarrier block sets in the radio cells of the cell cluster. This rule for the distribution of power levels may be especially applicable in situations in which the number of available transmission power levels is chosen to be larger or equal to the number of subcarrier block sets.

Further, the plurality of transmission power levels may be assigned to the subcarrier block sets of radio cells of the cell cluster, such that in a single radio cell, there is a mapping of each of the plurality of subcarrier block sets of the single radio cell to a transmission power level, and there is a mapping of each of the corresponding subcarrier block sets in the radio cells of the cell cluster to one of the plurality of transmission power levels. In contrast to the distribution rule exemplary mentioned above, this rule for the distribution of power levels may be especially applicable in situations in which the number of available subcarrier block sets is chosen to be larger or equal to the number of transmission power levels.

According to another embodiment, the mapping used in the two above mentioned assignment rules is a unique mapping. This means that e.g. when mapping the transmission power levels to subcarrier block sets, each of the transmission power levels is mapped to a corresponding single subcarrier block set. If the subcarrier block sets are mapped to the transmission power levels, each subcarrier block set is mapped to a corresponding single transmission power level.

To simplify the distribution of transmission power levels and subcarrier block sets, their number may be determined based on the number of radio cells forming a cell cluster. Hence, in a further embodiment, the present invention provides a method for balancing the distribution of interference between radio cells in a wireless communication system, comprising a plurality of radio cells in which a plurality of subcarrier blocks is used for communication, wherein each subcarrier block comprises a plurality of subcarriers. Further, N adjacent radio cells may build a cell cluster, wherein N is an integer number of 2 or more.

According to this embodiment of the present invention the subcarrier blocks may be grouped into N subcarrier block sets in each radio cell of the cell cluster. Hence, the number of subcarrier block sets corresponds to the number of radio cells in a cluster in this embodiment. Further, N transmission power levels may be determined for each of the radio cells of the cell cluster and the N transmission power levels may be assigned to the N subcarrier block sets of radio cells of the cell cluster, such that each of the N transmission power levels in a radio cell is assigned to one of the N subcarrier block sets of the radio cell, and each of the N transmission power levels is assigned to one subcarrier block set of corresponding subcarrier block sets.

When choosing the number of cells in a cell cluster, the number of subcarrier block sets and the number of transmission power levels as proposed in this embodiment, the general distribution rules as defined above may be significantly simplified.

Another embodiment of the present invention relates to a system in which the number of transmission power levels and subcarrier block sets are each integer multiples of the number of radio cells in a cell cluster. This embodiment also provides a method for balancing the distribution of interference between radio cells in a wireless communication system. Again the system may comprise a plurality of radio cells in which a plurality of subcarrier blocks is used for communication, wherein each subcarrier block may comprise a plurality of subcarriers. N adjacent radio cells may build a cell cluster, wherein N may be an integer number of 2 or more.

According to the method, the subcarrier blocks may be grouped into x·N subcarrier block sets in each radio cell of the cell cluster, wherein the radio cells of the cell cluster each comprise corresponding subcarrier block sets having the same subcarriers. x represents an integer number of 1 or more. Further, y·N transmission power levels may be determined for each of the radio cells of the cell cluster, wherein y is an integer number of 1 or more.

Next, the y·N transmission power levels may be assigned to the x·N subcarrier block sets of radio cells of the cell cluster, such that each of the y·N transmission power levels in a radio cell is assigned to one of the x·N subcarrier block sets of the radio cell, and y/x transmission power levels on average are assigned to one subcarrier block set of corresponding subcarrier block sets.

It is noted that the ratio y/x may also result in a non-integer number depending on the choice of the parameters x and y. Obviously, it is not possible to assign half of a transmission power level to a subcarrier block set. However, it is possible to distribute an integer number of power levels to subcarrier block sets such that different quantities of power levels are assigned to each of the subcarrier block sets. Hence, on average the ratio of y/x power levels is assigned.

It is further noted that the different embodiments of the method for balancing the interference in a wireless communication system outlined above should not be understood as restricting the power levels in the different cells of a cell cluster to identical power levels. The individual power levels in each radio cell of a cell cluster may be identical or may be different from each other. This is of advantage to be able to adapt to the e.g. respective channel conditions and cell-sizes in the different cells.

In all embodiments above, the method may further comprise the steps of measuring the path loss of a communication signal of a communication terminal and the path loss of the interference from adjacent cells. The embodiments above may further comprise the assignment of the communication terminal to one or multiple subcarrier blocks of one of the subcarrier block sets based on the measurement.

A transmission power level for the communication terminal may be determined based on the above mentioned measurement, and the communication terminal may be assigned to at least one subcarrier block set based on the determined transmission power level.

It should be noted that the actual channel assignment may be carried out onto a subcarrier block. In this context, the assignment to a subcarrier block set may be regarded as a pre-selection.

In an alternative embodiment, it may also be considered to assign a block set to a communication terminal first and to choose the respective transmission power level based on the assignment. Hence, the transmission power level may be determined based on the assigned block set.

The transmission power level of the assigned subcarrier block set may be indirectly proportional to the ratio of the measured signal path loss and the measured interference path loss. Consequently, for a communication terminal that is located close to a base station of a radio cell the measurement results may indicate that a low transmission power level may be sufficient for a communication between the communication terminal and the base station. In contrast, for a communication terminal that is located near to the cell boundaries of a radio cell the measurement results may indicate that an accordingly high transmission power level may be required for a communication between the communication terminal and the base station.

Further, it should be noted that e.g. a degrading channel quality may not be countered by raising the transmission power level. Alternatively, the transmission power may only be increased at a low level or remain constant. The degradation in the channel quality may be countered by changing the modulation (and coding) scheme used on a channel (or for a subcarrier block) or by changing the assigned subcarrier block set.

It is of further advantage, if the transmission power levels in different radio cells of a cell cluster vary, such that same may be adapted to the respective channel conditions in each of the radio cells of the cell cluster.

To be able to adapt to changing channel quality conditions also the subcarrier block sets in a radio cell may be reconfigured. For the same reason as above also the transmission power levels in a radio cell may be reconfigured.

The reconfiguration of the power levels and/or the subcarrier block sets in the radio cell may be performed in accordance with the other radio cells of its cell cluster. The reconfiguration may be based on channel quality measurements in the radio cell and/or the other radio cells of its cell cluster.

Further, information related to a reconfiguration of the subcarrier block sets in a radio cell may be signaled from the radio cell to the other radio cells of its cell cluster or may be signaled from a supervising unit (e.g. radio network controller) to the radio cells forming a cell cluster.

According to a further embodiment of the present invention also information related to channel qualities in a radio cell may be signaled from the radio cell to the other radio cells of its cell cluster. By signaling the channel qualities in a radio cell to adjacent radio cells, same may include the information when reconfiguring the transmission power levels or subcarrier block sets in the respective radio cell.

The main idea underlying the present invention may also be applicable to systems in which radio cells are divided into sectors, i.e. to systems using multi-beam antennas or multiple antennas. Employing this layout, a single cell may be divided in a plurality of sectors each covered by an antenna beam. According to another embodiment, the present invention therefore provides a method for balancing the distribution of interference between radio cells in a wireless communication system. The system may comprise a plurality of radio cells each of them comprising at least two sectors, wherein in each sector a plurality of subcarrier blocks is used for communication. Each subcarrier block may comprise a plurality of subcarriers, and a number of adjacent radio cells build a cell cluster.

The subcarrier blocks may be grouped into a plurality of subcarrier block sets in each of the sectors of each radio cell of the cluster. A plurality of transmission power levels may be determined for each sector of each radio cell of the cell cluster. Next, the plurality of transmission power levels may be assigned to the plurality of subcarrier block sets of a sector of a radio cell and its adjacent sectors of the other radio cells.

Each sector of a radio cell may have adjacent sectors belonging to other radio cells of the cell cluster. Further, a sector of a radio cell and its adjacent sectors in the other radio cells may build a sector cluster and each may comprise corresponding subcarrier block set having the same subcarriers.

The plurality of transmission power levels may be assigned to the subcarrier block sets of radio cells of the cell cluster, such that in a single sector of a radio cell, there is a mapping of each of the plurality of transmission power levels to a subcarrier block set of the sector, and there is a mapping of each of the plurality of transmission power levels to one of the corresponding subcarrier block sets in the sector cluster.

Alternatively, the plurality of transmission power levels may be assigned to the subcarrier block sets of radio cells of the cell cluster, such that in a single sector of a radio cell, there is a mapping of each of the plurality of subcarrier block sets of the sector to a transmission power level, and there is a mapping of each of the plurality of the corresponding subcarrier block sets in the sector cluster to one transmission power level.

As outlined above, the mapping may be a unique mapping.

To simplify the distribution of transmission power levels and subcarrier block sets, their number may be determined in relation to the number of radio cells forming a cell cluster. Hence, in a further embodiment, the present invention provides a method for balancing the distribution of interference between radio cells in a wireless communication system. The system may comprise a plurality of radio cells each of them comprising at least two sectors, wherein in each sector a plurality of subcarrier blocks is used for communication, wherein each subcarrier block comprises a plurality of subcarriers. A number of adjacent radio cells may build a cell cluster.

The subcarrier blocks may be grouped into N subcarrier block sets in each of the sectors of each radio cell of the cluster, wherein each sector of a radio cell may have N−1 adjacent sectors in the other radio cells of the cell cluster, and wherein a sector of a radio cell and its adjacent sectors in the other radio cells each comprise corresponding subcarrier block set having the same subcarriers. N may be an integer number of 2 or more.

Further, N transmission power levels may be determined for each sector of each radio cell of the cell cluster. The N transmission power levels may be assigned to the N subcarrier block sets of a sector of a radio cell and its adjacent sectors of the other radio cells, such that in a sector, each of the N transmission power levels in the sector of a radio cell is assigned to one of the N subcarrier block sets of the sector, and each of the N transmission power levels is assigned to one subcarrier block set of corresponding sectors.

Another embodiment of the present invention relates to a system in which the number of transmission power levels and subcarrier block sets are each integer multiples of the number of radio cells in a cell cluster. This embodiment also provides a method for balancing the distribution of interference between radio cells in a wireless communication system. Again, the system may comprise a plurality of radio cells each of them comprising at least two sectors, wherein in each sector a plurality of subcarrier blocks is used for communication, wherein each subcarrier block comprises a plurality of subcarriers. A number of adjacent radio cells may build a cell cluster.

In this embodiment, the subcarrier blocks may be grouped into x·N subcarrier block sets in each of the sectors of each radio cell of the cluster, wherein each sector of a radio cell may have N−1 adjacent sectors in the other radio cells of the cell cluster, and wherein a sector of a radio cell and its adjacent sectors in the other radio cells each comprise corresponding subcarrier block set having the same subcarriers. x may be an integer number of 1 or more. N may be an integer number of 2 or more.

Further, y·N transmission power levels may be determined for each sector of each radio cell of the cell cluster, wherein y may be an integer number of 1 or more.

The y·N transmission power levels may be assigned to the x·N subcarrier block sets of a sector of a radio cell and its adjacent sectors of the other radio cells, such that in a radio cell, each of the y·N transmission power levels in a sector of a radio cell is assigned to one of the x·N subcarrier block sets of the sector, and y/x transmission power levels on average are assigned to one subcarrier block set of corresponding sectors.

The communication system may further comprise a plurality of communication terminals communicating with base stations associated to the plurality of radio cells. The path loss of a communication signal of a communication terminal and the path loss due to interference from adjacent sectors for the communication signal may be measured e.g. at a base station, and the communication terminal may be assigned to at least one subcarrier block of a subcarrier block set in a sector based on the measurement.

In a further step a transmission power level for the communication terminal may be determined based on the measurement, and the communication terminal may be assigned to a block set based on the determined transmission power level.

According to another embodiment, it may also be considered to assign a block set to a communication terminal first and to choose the respective transmission power level based on the assignment. Hence, the transmission power level may be determined based on the assigned block set.

The transmission power levels in different sectors may vary as well as the transmission power levels in sectors of a radio cell.

Further, the subcarrier block sets may be reconfigured in a sector of radio cell. Same applies to the transmission power levels of a sector as well.

The reconfiguration of the power levels and/or the subcarrier block sets in the sector may be performed in accordance with the other sectors of its sector cluster. Further, the reconfiguration may be based on channel quality measurements in the sector and/or the other sectors of its sector cluster.

In the context of reconfiguration, information related to a reconfiguration of the subcarrier block sets in a sector may be signaled from its radio cell to radio cells comprising sectors of the sector cluster. Also, information related to channel qualities in a sector may be signaled from its radio cell to radio cells comprising sectors of the sector cluster.

Independent from the system architecture, i.e. the usage of sectorized radio cells or not, the information related to the reconfiguration of power levels or subcarrier block sets may be signaled to a control unit in the communication system. Taking the example of the Release 99/4/5 UTRAN (UMTS Terrestrial Radio Access Network) architecture, such a control unit may be a radio network controller (RNC) or, in the evolved architecture an functionally enhanced Node B, the Node B+.

Further, also independent from the system architecture, information related to a subcarrier block assignment and/or a subcarrier block set assignment may be signaled to a communication terminal.

According to a further embodiment of the present invention, a communication terminal in a wireless communication system is provided. The communication terminal may comprise receiving means for receiving the information indicating a subcarrier block assignment and/or a subcarrier block set assignment, and selection means for selecting the signaled assigned subcarrier block and/or signaled assigned subcarrier block set for data transmission.

All the different embodiments of the inventive method for balancing the co-channel interference in radio cells may be advantageously used in a base station. The base station may be equipped with the respective means for performing the different method steps according to the different embodiments of method as outlined above. The present invention also provides radio communication system comprising a base station adapted to carry out the method according to the different embodiments and at least one communication terminal.

BRIEF DESCRIPTION OF THE DRAWINGS

In the following the present invention is described in more detail in reference to the attached figures and drawings. Similar or corresponding details in the figures are marked with the same reference numerals.

DETAILED DESCRIPTION

Figure 1:
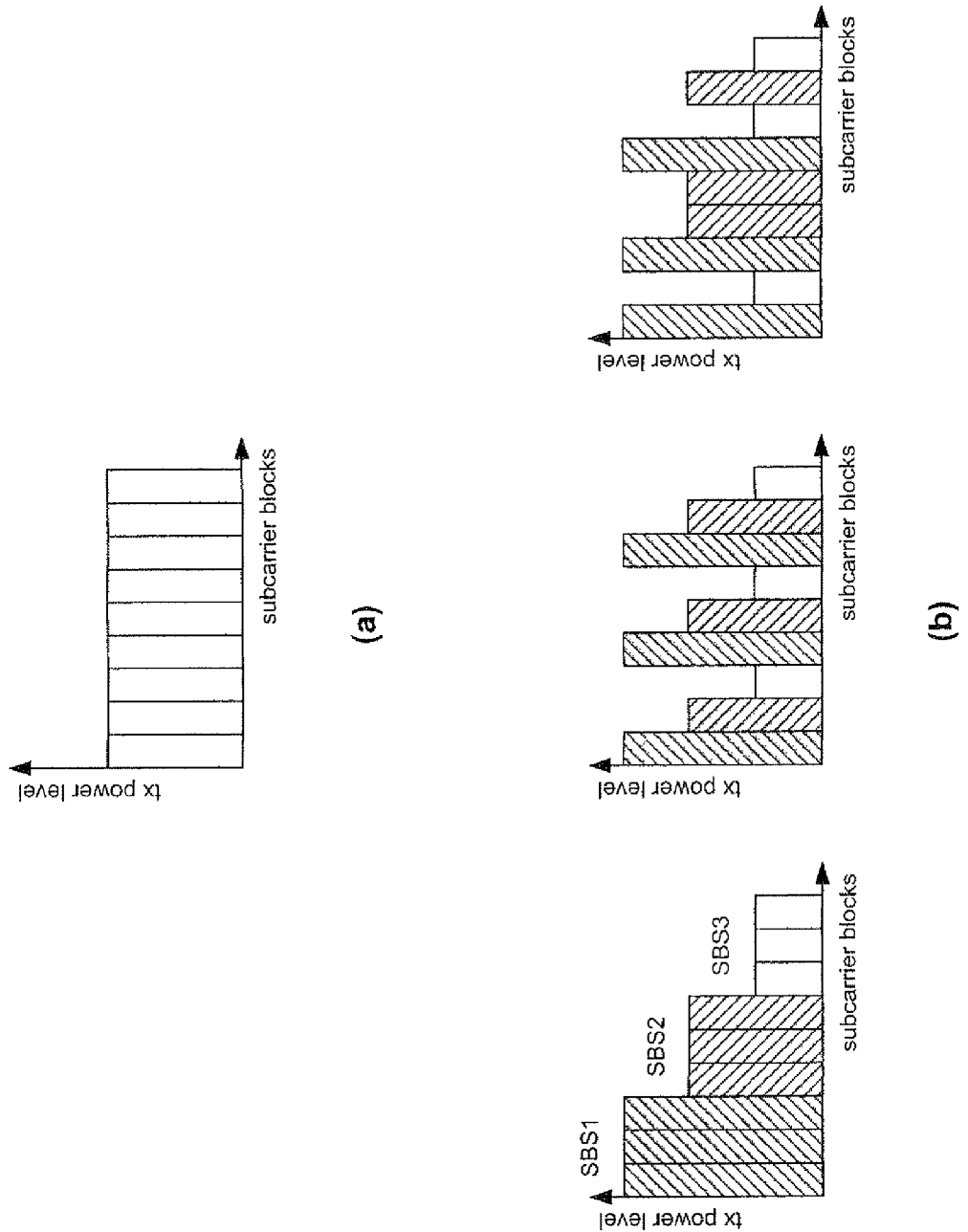
FIG. 1 shows the transmit (TX) power for subcarrier blocks in the prior art (a) and three examples for a given radio cell (b) with different power offsets for subcarrier blocks belonging to the subcarrier block sets (SBS) (with $P_{SBS\,1} > P_{SBS\,2} > P_{SBS\,3}$) according to and embodiment of the present invention.

In the following the present invention will be described with regard to wireless communication system using OFDM.

Though the examples relate to OFDM, it should be noted that the ideas underlying the present invention may be readily applied to other FDM based communication systems as well.

According to an embodiment of the present invention the OFDM subcarrier blocks may be divided into N subcarrier block sets (SBS). For each SBS a different constant (or semi-static) transmit power level is defined, as depicted for three examples in FIG. 1(b). The assignment of the transmission power levels may be performed in accordance with the SBS power levels in adjacent cells in order to manipulate the distribution of the SIR levels within radio cells.

Compared to prior art, this power-offset assignment may have two major impacts on the system: Firstly, it allows to assign mobile stations such, that the path loss can be compensated somewhat by assigning subcarrier blocks from appropriate SBSs. I.e. mobile stations in low geometry can preferably be assigned to SBSs with high transmit power (and low intercell-interference) and mobile stations in high geometry can preferably be assigned to SBSs with low transmit power (and high intercell-interference). Hence, the average SIR for mobile stations in low geometry (at the cell edge) should be increased and the average SIR for mobile stations in high geometry (close to the cell center) should be decreased. The term "geometry" may refer to the quality of a communication link between a communication terminal and a base station in a radio cell given a specified transmit power. The geometry may be inversely proportional to the path loss, which is dependent on e.g. the distance of the communication terminal to the base station, obstructions such as buildings, etc.

Secondly, the created amount of interference in adjacent cells may differ significantly for the SBSs, which in turn influences the SIR of links in adjacent cells. Compared to a DCA and AMC system with Power Control (PC), the amount of interference may be estimated more precisely, since the power levels cannot change instantaneously (assuming full load) and, hence, may be known in adjacent cells. I.e., in case the assigned MS to a given subcarrier block in an adjacent cell changes, the created interference does not change, since the transmitted power remains constant (except fast fading effects).

In the following simulation of the SIR distribution within radio cells and the distribution's standard deviation will be presented for a prior art communication system (see FIG. 1(a), FIG. 3 and FIG. 4) as well as for systems according to the different embodiments of the present invention (see FIG. 1(b), FIG. 5 to 10).

In the simulation, the following assumptions have been made. A regular hexagonal cell layout with one sector per radio cell (omni directional antenna pattern) has been chosen. An example of the cell layout is for example shown in FIG. 5. Further, there are three SBS per cell (N=3), wherein a SBS is build of adjacent subcarrier blocks (example 1 in FIG. 2).

Moreover each SBS contains an equal number of subcarrier blocks. The mobile stations are distributed uniformly in each cell. The system is fully loaded, i.e. all subcarrier blocks are used in all radio cells, i.e. all radio cells transmit on all subcarrier blocks with a predetermined transmission power level. Further, a perfect hard-handover is provided, i.e. mobile stations which are physically located within the hexagon of cell A belong to cell A. All base stations transmit with equal total power and the power level ratios between SBSs may be equal for all cells. The simulations show average SIR values, i.e. fast fading effects have been neglected.

Figure 3:
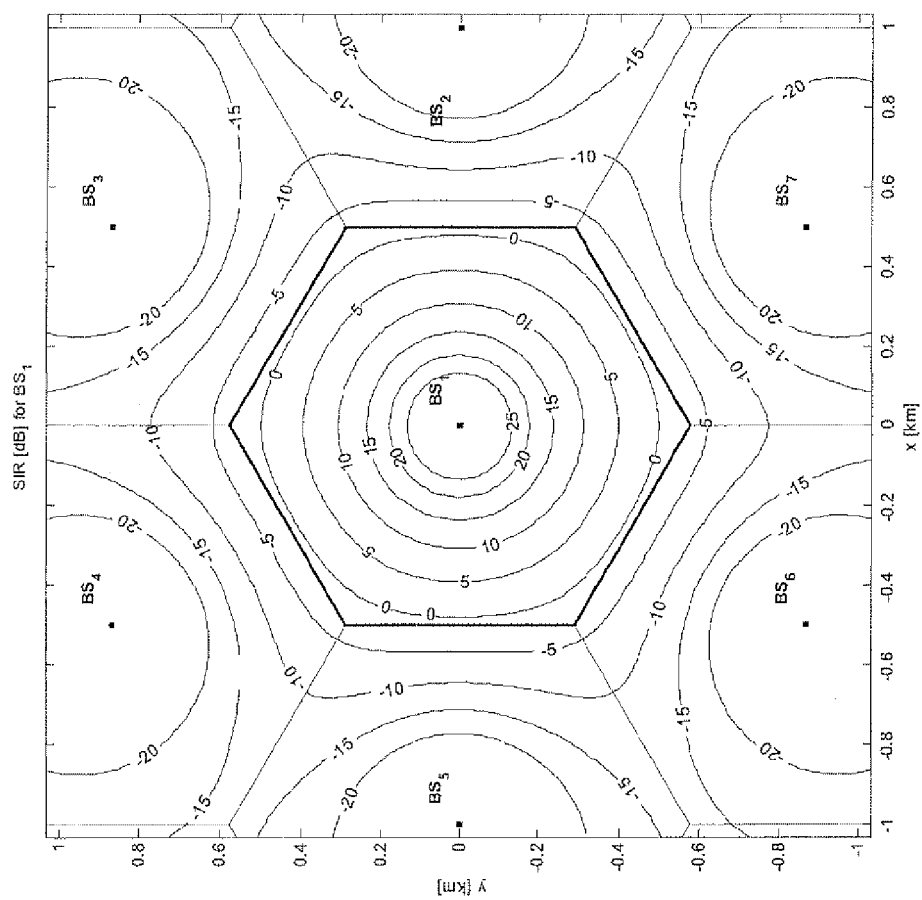
FIG. 3 shows a distribution of the average SIR depending on the geometry with respect to a base station for a prior art system without power control.

FIG. 3 shows the SIR distribution (for any subcarrier block) with respect to a radio cell and its base station $BS_1$ for a prior art system without power control, when the respective subcarrier block is used in all adjacent cells (interference form from non-adjacent cells is neglected). I.e. in the example a constant transmission power level for all subcarrier blocks is used. The SIR distribution within the radio cell boundaries of $BS_1$ spreads over a large range in dB, with a standard deviation (STD) of 8.4 dB (see FIG. 4). Hence, in a conventional system the SIR for a radio channel between base station $BS_1$ and a communication terminal close to the base station $BS_1$ may be larger than required for data reception with the modulation coding scheme providing the highest data rate (highest SIR requirement) at a given bit/block error rate. However, close to the radio cell's boundary the SIR may drop below a level necessary for data reception with the modulation coding scheme providing the lowest data rate (lowest SIR requirement) at a given bit/block error rate. As can be seen in FIG. 4 there is a large standard deviation in the distribution of SIR levels within the radio cell. It is noted that the rightmost bar in the figure represents all SIR of 30 dB and above in the radio cell.

One aspect of the present invention is to achieve a more homogeneous or balanced average SIR distribution within a radio cell. Hence, the present invention according to one embodiment aims to decrease the SIR STD, to counter the problems mentioned in the introduction and without introducing the problems involved with power control.

Bearing in mind, that the SIR is influenced by both the received signal power and the received interference power, two effects may be observed. Firstly, the received average signal power decreases with increasing distance between BS and MS (path loss). Secondly, the received intercell-interference power increases with increasing distance between BS and MS, since the distance to at least one adjacent interfering BS decreases.

Both effects are addressed by the present invention. The first effect may be countered by the definition of different transmission power levels for the defined SBSs as shown in the examples of FIG. 1(b).

FIG. 1(b) shows three different examples for the division of subcarrier blocks into subcarrier block sets. Taking the leftmost example in the figure, the first three subcarrier blocks are assigned to a subcarrier block set which is in turn associated with a transmission power level $P^1_{SBS\ 1}$. As becomes clear from this example, a predetermined number of consecutive subcarrier blocks may be grouped into a subcarrier block set which is assigned to a transmission power level. The example shown in the middle of FIG. 1(b) provides subcarrier blocks in predetermined intervals to a single subcarrier block set. Every third subcarrier block is assigned to a subcarrier block set. However, it is also possible to freely distribute subcarrier blocks to different subcarrier block sets, as illustrated in the right-most example of FIG. 1(b). In all three examples shown, the different subcarrier block sets and their subcarrier blocks are indicated by the different height of the bars shown in the figure. Further, it should be noted that not necessarily an equal number of subcarrier blocks has to be assigned to each of the subcarrier block sets, but the total available subcarrier blocks may be freely distributed into subcarrier block sets.

The definition of different transmission power levels may provide the possibility to map mobile stations in low geometry to subcarrier blocks belonging to a SBS with high transmit power, to map mobile stations in medium geometry to subcarrier blocks belonging to a SBS with medium transmit power and to map mobile stations in high geometry to subcarrier blocks belonging to a SBS with low transmit power. It is noted again, that only exemplary three transmission power levels are used in this embodiment.

The second effect is mainly addressed by way of assignment rules for the distribution the transmit power levels to the SBSs in adjacent cells in a multi-cell system. Considering a cell cluster of three radio cells, the examples in FIG. 2 show that the power levels in radio cells 1-3 are assigned such that for respective SBSs a high, a medium and a low power level is defined. i.e., it is noted that the different exemplary subcarrier block set allocations correspond to the examples shown in FIG. 1(b).

Figure 5:
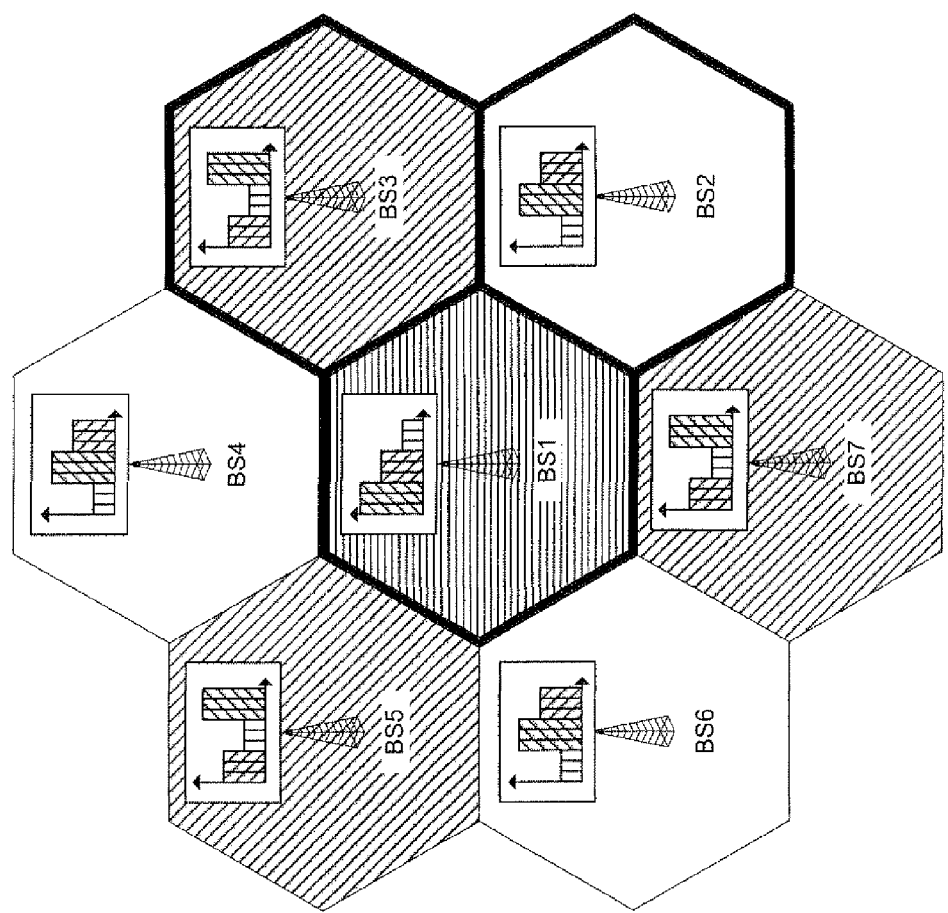
FIG. 5 shows a SBS power allocation pattern in a hexagonal cell layout with three SBSs.

The following rule for the assignment of power levels may be defined: Given a radio cell 1 (BS$_1$) with a SBS transmit power levels ($P^{radio\ cell}_{SBS\ number}$) combination of $P^1_{SBS\ 1} \geq P^1_{SBS\ 2} \geq P^1_{SBS\ 3}$, the SBS transmit power level combinations for adjacent radio cells 2 (BS$_2$) and 3 (BS$_3$) are defined as $P^2_{SBS\ 2} \geq P^2_{SBS\ 3} \geq P^2_{SBS\ 1}$ and $P^3_{SBS\ 3} \geq P^3_{SBS\ 1} \geq P^3_{SBS\ 2}$. It is further noted that a cell cluster does not comprise all adjacent radio cells. As shown in FIG. 5, the resulting "cluster structure" is comparable to those known from channel reuse schemes.

Figure 2:
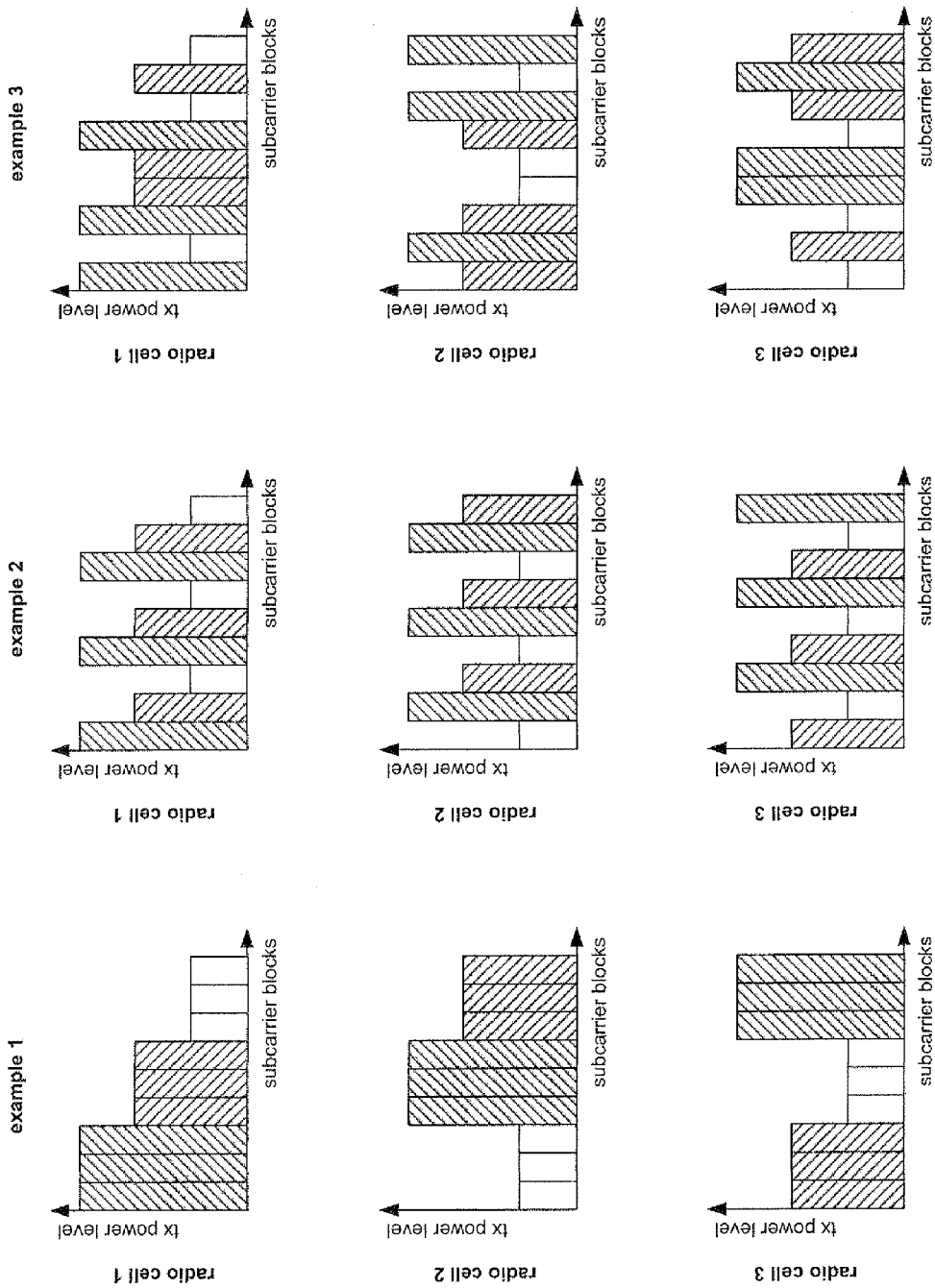
FIG. 2 shows three examples showing the multi-cell SBS configuration with three equal sized subcarrier block sets according to an embodiment of the present invention.

Though the examples shown in FIG. 2 refer to three subcarrier block sets per radio cell and three transmission power levels, the present invention is generally applicable to any number of transmission power levels and subcarrier block sets in a radio cell. As becomes obvious from the example given above, certain constellation in the choice of the number of transmission power levels and the number of subcarrier block sets may facilitate a simple assignment rule of transmission power levels to subcarrier block sets (or vice-versa).

The following matrix shows an example for the generalization of the "assignment rule" stated above:

|  | SBS$_1$ | SBS$_2$ | SBS$_3$ | ... | SBS$_{M-1}$ | SBS$_M$ |
|---|---|---|---|---|---|---|
| radio cell 1 | $P^1_1$ | $P^1_2$ | $P^1_3$ | ... | $P^1_{X-1}$ | $P^1_X$ |
| radio cell 2 | $P^2_X$ | $P^2_1$ | $P^2_2$ | ... | $P^2_{X-2}$ | $P^2_{X-1}$ |
| radio cell 3 | $P^3_{X-1}$ | $P^3_X$ | $P^3_1$ | ... | $P^3_{X-3}$ | $P^3_{X-2}$ |
| ... | ... | ... | ... | ... | ... | ... |
| radio cell N − 1 | $P^{N-1}_3$ | $P^{N-1}_4$ | $P^{N-1}_5$ | ... | $P^{N-1}_1$ | $P^{N-1}_2$ |
| radio cell N | $P^N_2$ | $P^N_3$ | $P^N_4$ | ... | $P^N_X$ | $P^N_1$ |

In the table above, the power levels $P^n_x$ of an index x may vary between different radio cells or may represent the same power level. It is Important to note, that in the given example the index x=1 refers to the lowest of the chosen power levels $P^n_x$ in radio cell n, while x=X refers to the largest chosen power level $P^n_x$ in radio cell n. Moreover, $P^n_x \leq P^n_{x-1}$ is valid for all x. The distribution of the power levels among different cells is achieved by a permutation of the index x indicating the strength i.e. power level of a signal emitted by a base station of radio cell n. As can be further seen in the table, each of the power intensity indices $x \in \{1, 2, 3, \ldots, X\}$ occurs once in each column and each row of the matrix. Hence, in the example shown, the number of subcarrier block sets M equals the numbers of transmission power levels X. Also the number of radio cells in a cluster N is the same as the number of subcarrier block sets M or transmission power levels X respectively. Note, that a further embodiment of the present invention allows setting $P^n_x = P^n_{x-1}$, which essentially means that in the respective cell SBS$_m$ and SBS$_{m+1}$ can have an identical transmit power. Obvious, this may only be valid for selected subcarrier block sets. This embodiment is similar to the case when having less power levels than subcarrier block sets for a given cell and a single power levels is used for multiple subcarrier block sets.

To further generalize the distribution rule, the following table addresses a situation in which there are more transmission power levels X than subcarrier block sets M, i.e. X>M. For simplicity, we assume X=2·M. Hence, always two power levels may be mapped on a single subcarrier block set.

|  | SBS$_1$ | SBS$_2$ | SBS$_3$ | ... | SBS$_{M-1}$ | SBS$_M$ |
|---|---|---|---|---|---|---|
| radio cell 1 | $P^1_1, P^1_2$ | $P^1_3, P^1_4$ | $P^1_5, P^1_6$ | ... | $P^1_{X-3}, P^1_{X-2}$ | $P^1_{X-1}, P^1_X$ |
| radio cell 2 | $P^1_{X-1}, P^1_X$ | $P^1_1, P^1_2$ | $P^1_3, P^1_4$ | ... | $P^1_{X-5}, P^1_{X-4}$ | $P^1_{X-3}, P^1_{X-2}$ |
| radio cell 3 | $P^1_{X-3}, P^1_{X-2}$ | $P^1_{X-1}, P^1_X$ | $P^1_1, P^1_2$ | ... | $P^1_{X-7}, P^1_{X-6}$ | $P^1_{X-5}, P^1_{X-4}$ |
| ... | ... | ... | ... | ... | ... | ... |
| radio cell N − 1 | $P^1_5, P^1_6$ | $P^1_7, P^1_8$ | $P^1_9, P^1_{10}$ | ... | $P^1_1, P^1_2$ | $P^1_3, P^1_4$ |
| radio cell N | $P^1_3, P^1_4$ | $P^1_5, P^1_6$ | $P^1_7, P^1_8$ | ... | $P^1_{X-1}, P^1_X$ | $P^1_1, P^1_2$ |

As the indices x in the power level $P^n_x$ indicate in the table neighboring power levels ($\{1,2\}, \{3,4\}, \ldots, \{X-1, X\}$) are mapped to a single subcarrier block set. It should be noted that of course any other distribution of two power levels to a subcarrier block set may be also possible according to a further embodiment of the present invention. Furthermore, in case there are more power levels chosen than subcarrier block sets available, it may be also possible to allocate for unequal numbers of transmission power levels to the subcarrier block sets. When choosing a distribution it should be considered to follow the rule as stated above, i.e. that each row and column in the matrix may only comprise each of the power level indices x once. In case of the definition of multiple power levels per subcarrier block set, the transmitter may be free to select any of those power levels for transmission. Typically, the transmitter selects the power level based on the instantaneous channel quality of the respective receiver to which to transmit to.

In case M>X, more than one subcarrier block set may be assigned to a single transmission power level. Also in case N≠M, i.e. the number of radio cells in a cluster and the number of subcarrier block sets is not equal, a distribution rule may follow the rule as stated above, i.e. that each row and column in the matrix may only comprise each of the power level indices x once.

When choosing the number of transmission power levels and subcarrier block sets equal to a multiple of the number of cells in a cell cluster, a simple distribution rule may be defined. In case the number of subcarrier block sets and the number of transmission power levels per radio cell are also equal, a simple mapping scheme as outlined above may be used.

The choice and distribution of power levels and subcarrier block sets may lead to a decreased interference level for the SBS with high transmit power and a to an increased interference level for the SBS with low transmit power compared to prior art systems.

Extending the rule to a hexagonal multi-cell layout build built out of 3-cell clusters it may be achieved, that adjacent cells are always assigned different SBS power levels as illustrated in FIG. 5.

Figure 6:
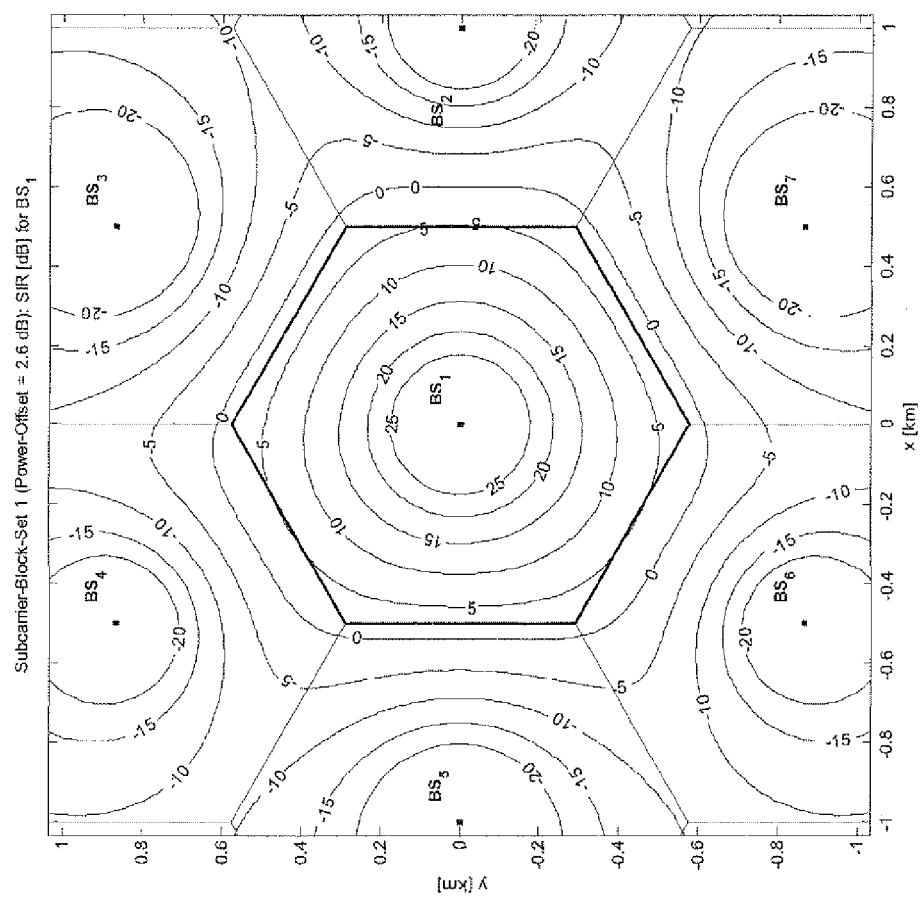
FIG. 6 to 9 show a distribution of the average SIR depending on the geometry for different transmission power levels of subcarrier block sets and for a combination of same according to an embodiment of the present invention.
Figure 7:
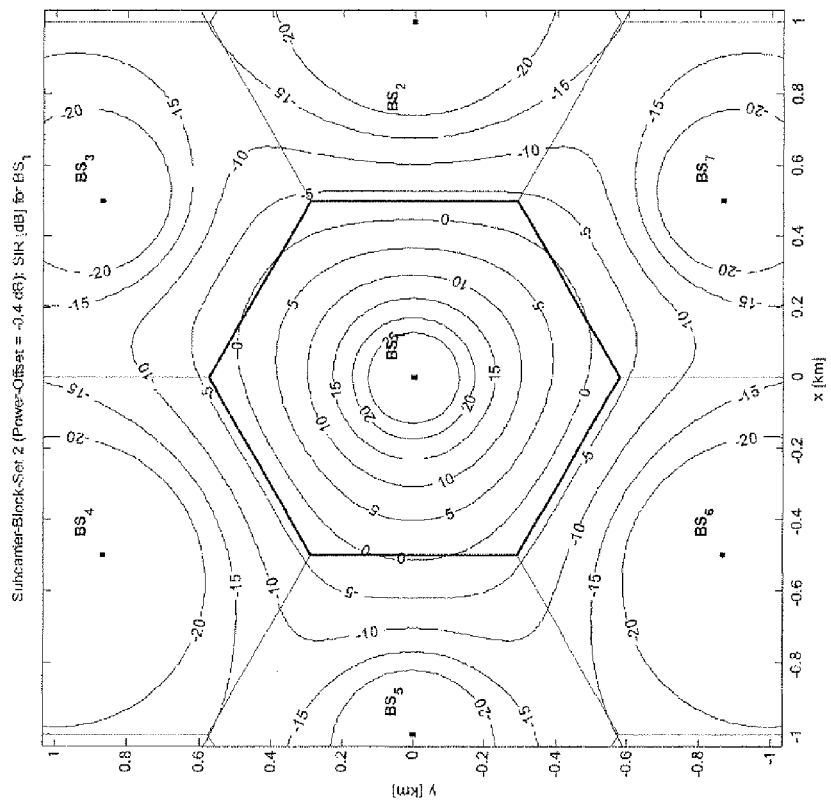
Figure 8:
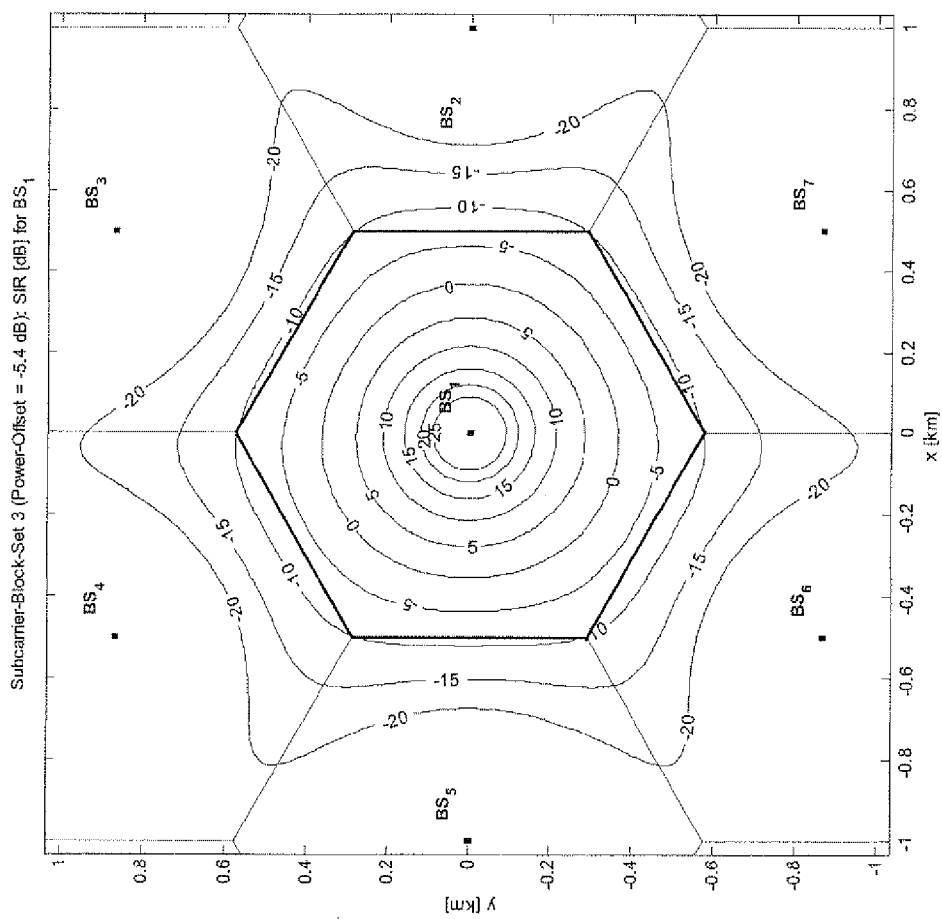

FIG. 6 to 8 show the SIR distribution for the SBS1 to SBS3 for radio cell 1 (BS$_1$), when the assigned transmit power offsets (power levels) are 2.6 dB, −0.4 dB and −5.4 dB for SBS 1, 2 and 3 respectively. The power offsets may be defined with respect to the average power per SBS of 0 dB, i.e. 2.6 dB+[0 −3 −8] dB). Within the boundaries of radio cell 1), it may be observed that for all SBSs the SIR decreases with increasing distance from $BS_1$. Moreover, as expected the average SIR decreases from SBS1 to SBS3.

Figure 9:
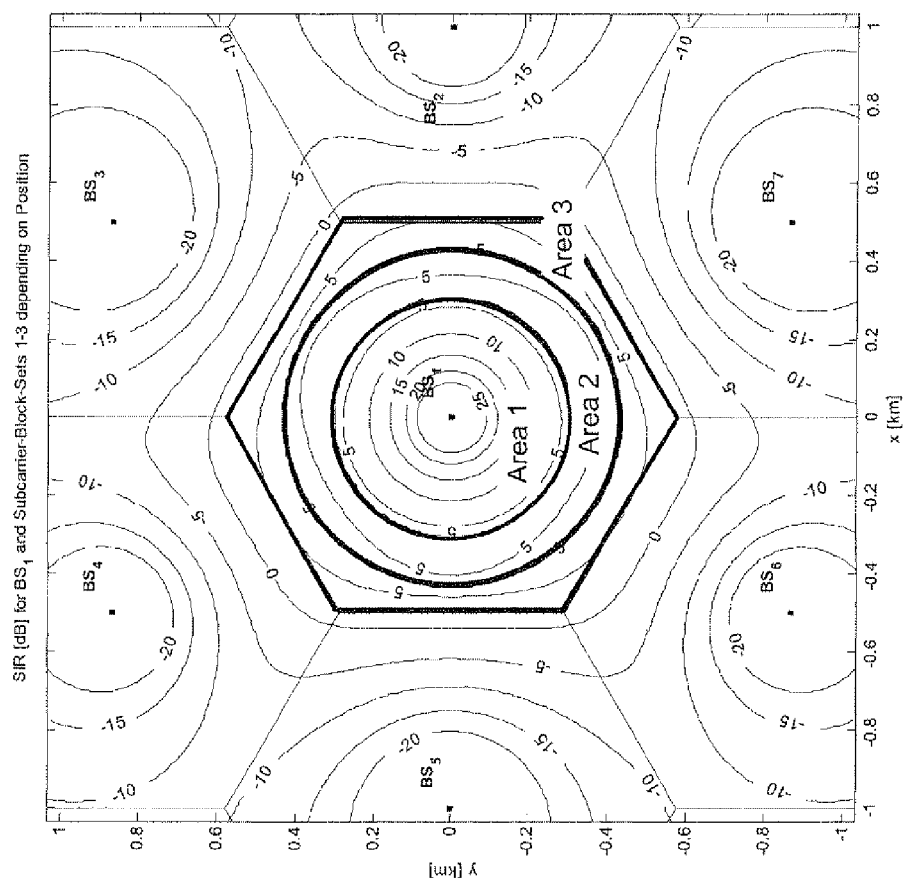

FIG. 9 shows the SIR distribution for the following setting. SBS1 (high power) covers the low geometries within radio cell 1 (Area 1), SBS2 (medium power) covers the medium geometries within cell 1 (Area 2), and SBS3 (low power) covers the high geometries within cell 1 (Area 3). I.e. mobile stations may be assigned to subcarrier blocks belonging to SBSs, which covers the area in which they are located. One should bear in mind that the geometry may depend on the path loss, which is not strictly coupled to the distance between transmitter and receiver, but may also depend on obstructions. The given example, however, depicts a simplified layout, where the path loss depends only on the distance.

Figure 4:
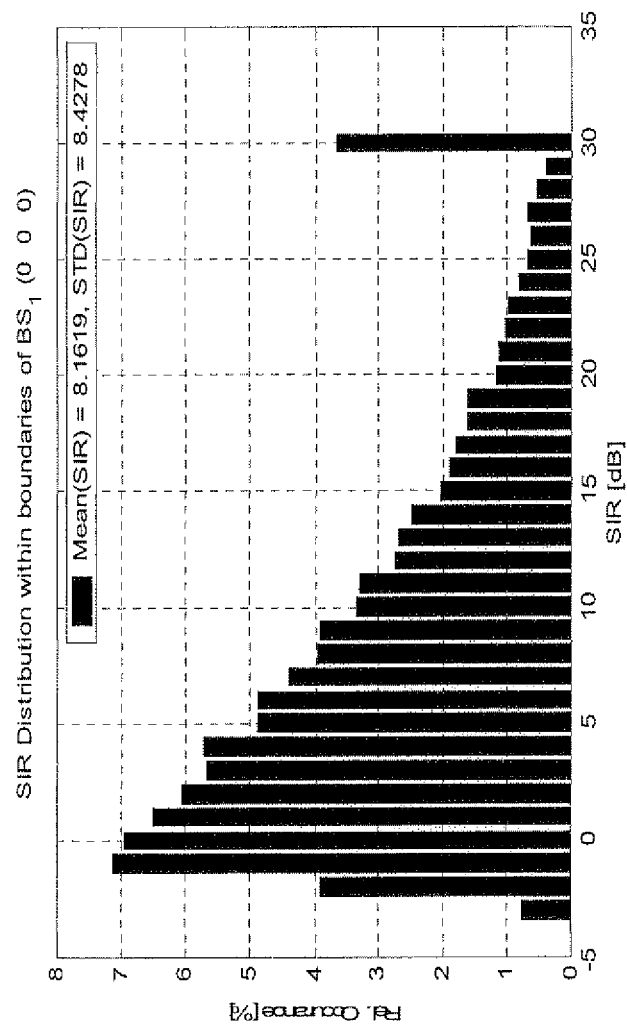
FIG. 4 shows the art relative SIR occurrences for the locations within the boundaries of a radio cell attached to a base station BS1 in the prior art.

Compared to the prior art SIR distribution in a radio cell as shown in FIGS. 3 and 4, the SIR distribution using the present invention is more homogeneous, i.e. the SIR close to the radio cell boundaries is increased and the SIR at the radio cell center is decreased.

Figure 10:
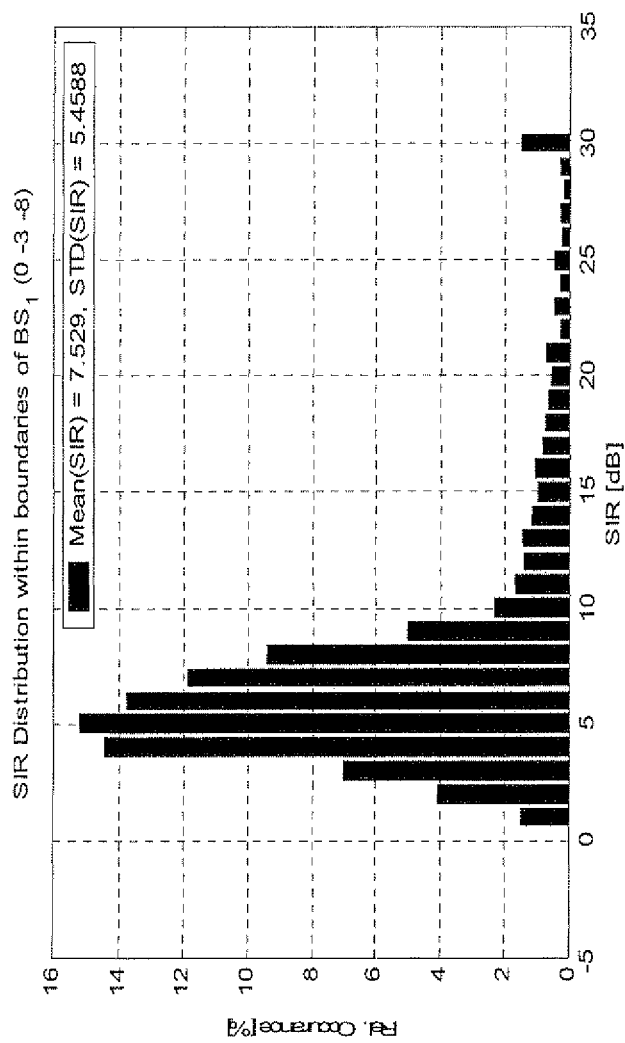
FIG. 10 shows the relative SIR occurrences for the locations within the boundaries of cell BS1 according to an embodiment of the present invention.

This effect is also illustrated in FIG. 10. The standard deviation (STD) of the SIR distribution within a radio cell is significantly lowered to 5.5 dB compared to the STD of 8.4 dB for prior-art systems. Looking at the SIR range from 1 to 10 dB, this means that for the given power offsets 85% of the average SIR values are within this range (49% for prior art). This allows defining the AMC schemes within a reasonable dynamic range. Moreover, this may help to achieve more homogeneous data rates for all mobile stations in a given cell. Further, the probability of having retransmissions to mobile stations in low geometry may be reduced as well as the probability of using power inefficient multilevel modulation schemes.

Figure 11:
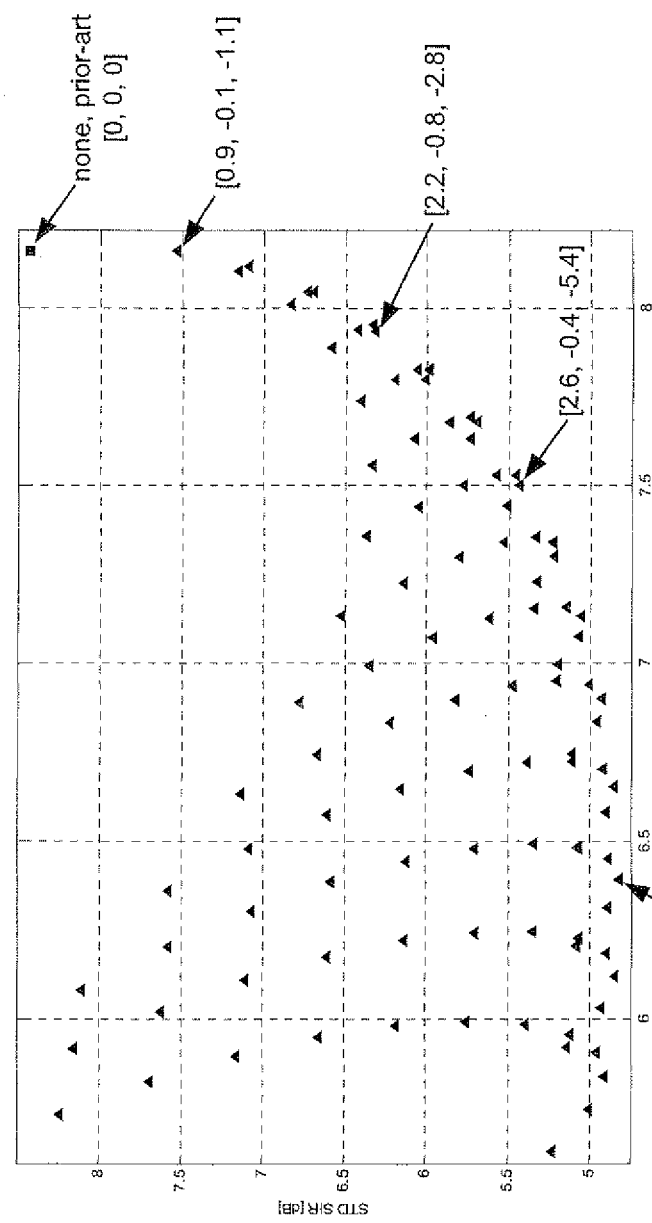
FIG. 11 shows the mean and standard deviation for the average SIR for selected power-offset combinations according to an embodiment of the present invention.

It should be noted, that the decrease in STD may also result in a decrease in the mean value of the average SIR. However, this decrease may not have a significant impact, since values beyond 30 dB—contributing significantly to the mean value of the average SIR in the prior art case—can usually not be utilized efficiently due to AMC limitations. FIG. 11 and the table below show results obtained for different power offset settings.

| Power Offsets [dB] | Mean (SIR) [dB] | STD (SIR) [dB] | Percentage between 1 and 10 dB [%] |
|---|---|---|---|
| None (prior art) [0 0 0] | 8.2 | 8.4 | 49 |
| [0.9 −0.1 −1.1] or [0 −1 −2] + 0.9 | 8.2 | 7.5 | 65 |
| [2.2 −0.8 −2.8] or [0 −3 −5] + 2.2 | 7.9 | 6.4 | 79 |
| [2.6 −0.4 −5.4] or [0 −3 −8] + 2.6 | 7.5 | 5.5 | 85 |
| [2.8 −0.2 −9.2] or [0 −3 −12] + 2.8 | 6.7 | 4.9 | 87 |

As can be seen in the table above, the mean SIR as well as the standard deviation is decreasing when employing the methods proposed according to the different embodiments of the present invention. Though the mean SIR is reduced, more communication terminals have an SIR in the range of 1 to 10 dB allowing e.g. more homogenous achievable data rates or more efficient utilization of AMC schemes.

What has to be understood is that according to one embodiment the key aspects of this embodiment are the definition of subcarrier block sets (SBS) within the radio cells of a wireless communication system as well as the definition of different power offsets (transmission power levels) for the SBSs. Further, the power offset definitions in adjacent cells may be aligned, such that at least the interference for the SBS with the highest power is reduced.

According to a further embodiment, a MS in low geometry may be assigned to high power SBSs and vice versa. I.e. a communication terminal is assigned a radio channel (subcarrier block set) based on its geometry. It should be noted that in a real (non-ideal hexagonal) deployment and environment the term geometry does not necessarily correspond to the MS-BS distance (MS distance to the cell center), but it refers more to the signal path loss. I.e. a MS can be very close to the BS, but have a low average SIR, since the signal path it is shadowed by a building and the interference path(s) is (are) LOS (line-of-sight).

A subcarrier block as used in the previous sections may comprise M subcarriers, where M may also be 1. I.e. in case of M=1 the system would be "reduced" to a FDM system.

A subcarrier block set (SBS) may contain S subcarrier blocks, where S can vary depending on the defined SBS. However, in a preferred embodiment the same subcarrier blocks may be used for respective SBSs in adjacent cells. In the latter case, for each of the subcarrier block sets in each radio cell of a cell cluster there may exist a corresponding subcarrier block set in an adjacent radio cell correspond in that the same subcarriers are assigned to the corresponding subcarrier block sets.

Further, the SBS power offsets may vary depending on the radio cell. For x defined SBSs, up to x−1 SBSs may have the same power offset. The power offsets may be reconfigured for each cell individually or in accordance with adjacent radio cells.

Another aspect of the present invention is related to the signaling for the (re)configuration of subcarrier block sets in the radio cells and the transmission power levels. Since a reconfiguration in a radio cell may be coordinated with adjacent the cell's radio cells, it may be necessary to signal information related to the reconfiguration to the adjacent cells.

For example information relating to the channel quality, i.e. interference levels in a radio cell may be signaled to the neighboring radio cells in order to enable same to use this information when considering a reconfiguration of their power levels used. Also when the grouping of subcarrier blocks into subcarrier block sets has to be changed, the new distribution or mapping of subcarrier blocks to subcarrier block sets have to be signaled to the adjacent cells, as those may use the same mapping in the respective cell.

Depending on the network architecture this information may also be transmitted to a supervising unit (e.g. radio network controller) controlling a cell cluster and may utilize respective information in order to initiate a (re)configuration.

According to a further embodiment of the present invention, another aspect of the invention is the signaling related to the communication between transmitter and receiver. The signaling between the transmitter and the receiver may comprise the signaling of a subcarrier block set assignment and a subcarrier block assignment. Before an actual frequent (frame-by-frame) assignment of the subcarrier block, there may be a relatively less frequent pre-assignment of a mobile station to a subcarrier block set, which may basically define an "active" subcarrier block set for the respective mobile station.

This may allow to reduce the signaling overhead for the subcarrier block assignment, since the signaling has only be performed with respect to the subcarrier block set to which the mobile station is pre-assigned. Moreover, it may allow reducing the signaling overhead for the channel quality feedback signaling from receiver to transmitter, which may be carried out only for the respective subcarrier block set.

Figure 12:
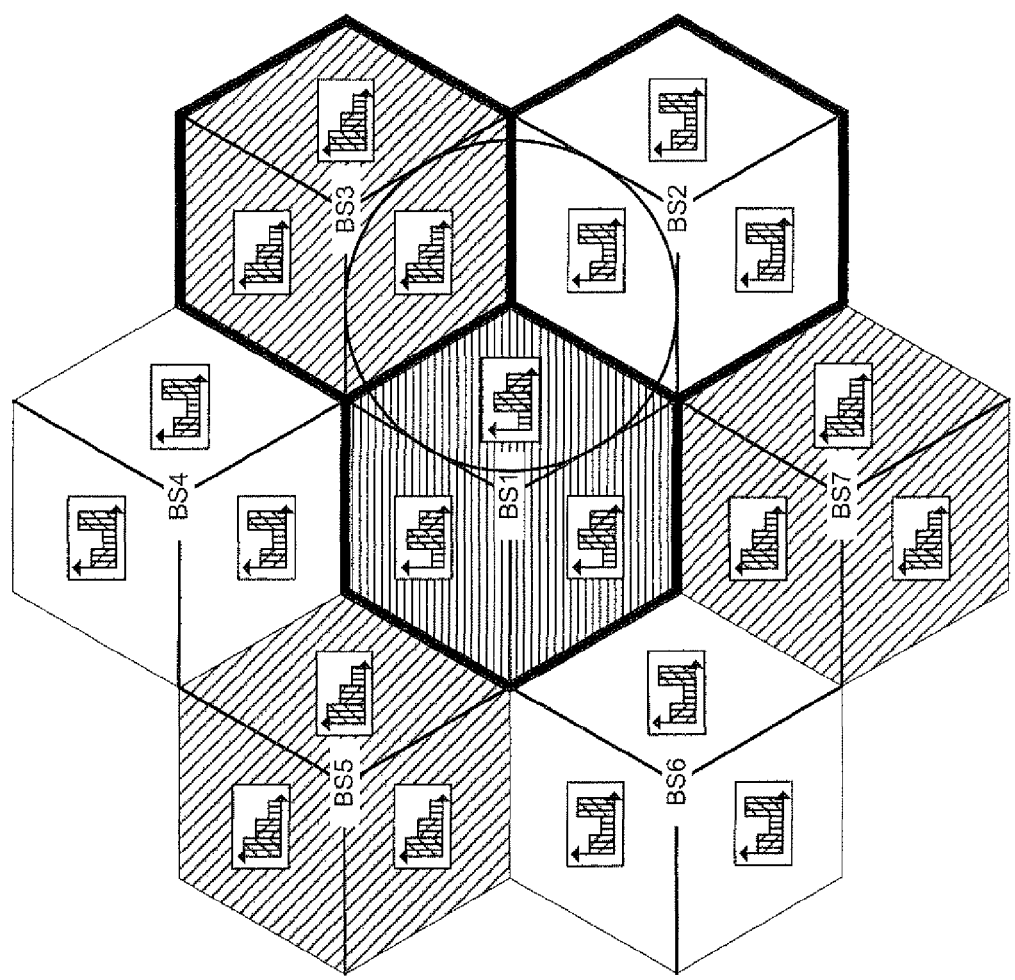
FIG. 12 shows an example for a SBS power allocation pattern in a hexagonal cell layout with three SBSs and three sectors per cell according to an embodiment of the present invention.
Figure 13:
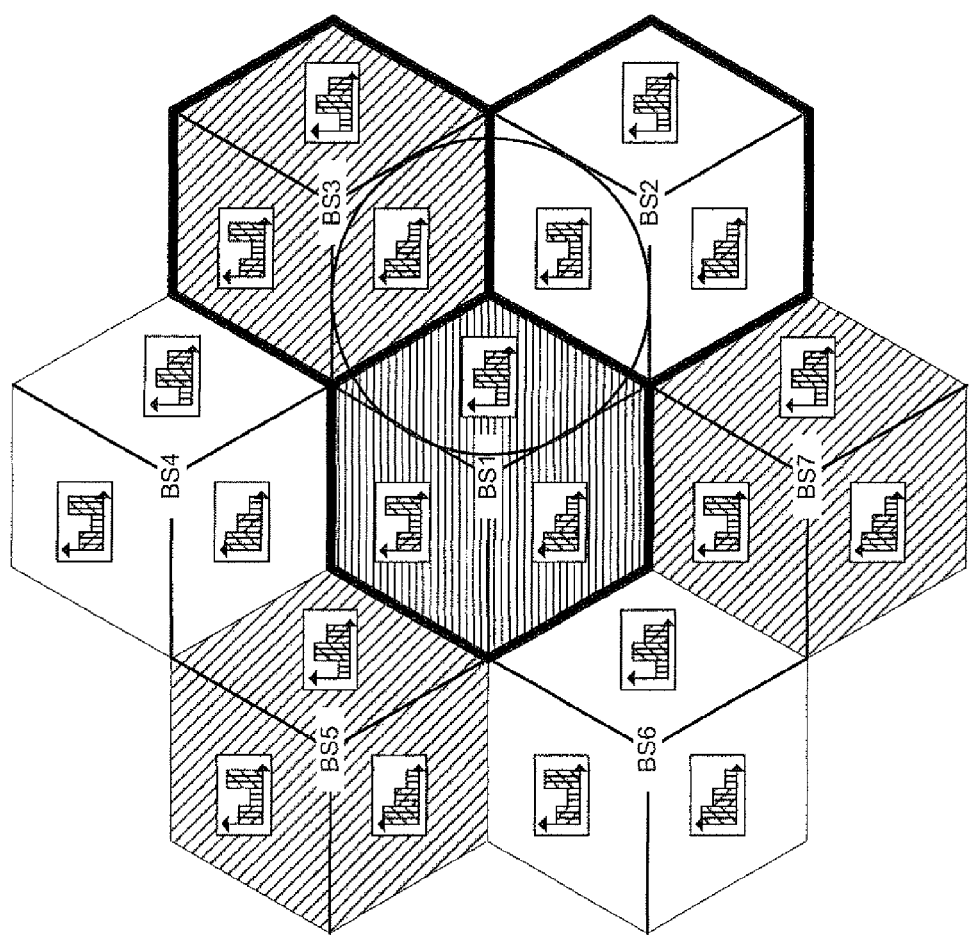
FIG. 13 shows another example of a SBS power allocation pattern in a hexagonal cell layout with three SBSs and three sectors per cell according to an embodiment of the present invention.

Further, it is noted that the ideas underlying the present invention may be applied to any cell layout. According to another embodiment of the present invention, a sectorized radio cell may be used. An example for a hexagonal radio cell layout with 3 sectors per cell is shown in FIGS. 12 and 13. It may be assumed that the antenna patterns of the adaptive array antennas define sectors within a radio cell which interfere with each other in a neglectable manner (i.e. antenna beam width $\leqq 120°$). In this case the interference of sectors of adjacent cells (within the antenna beam width) may be dominating. As shown in FIG. 12, for sector 2 of radio cell 1 ($BS_1$) there exist two adjacent sectors in adjacent radio cells, namely sector 2 in radio cell 3 ($BS_3$) and sector 3 in radio cell 2 ($BS_2$). These three adjacent sectors in the different radio cells may also be considered as a sector cluster.

In each of the sectors shown in a single radio cell, the same subcarrier blocks (i.e. subcarriers) may be simultaneously used. For balancing the interference the methods as proposed above for the use of non sectorized radio cells may be employed. The method is only adopted to the new cell layout in that instead of performing interference balancing on radio cells of a cell cluster, the interference between sectors of a sector cluster is balanced.

When comparing FIG. 12 to FIG. 5, it is noted that the same choice of the number of transmission power levels and subcarrier block sets and a similar mapping between power levels and subcarrier block sets may be employed. As illustrated in FIG. 12, the same power level-subcarrier block set combinations may be used within the sectors of a radio cell. Hence, the "pattern" of coordinated power level-subcarrier block set combinations among sectors belonging to a sector cluster may correspond to same known from FIG. 5 for coordinated power level-subcarrier block set combinations for a radio cell cluster. However, in case of employing multiple sectors within a radio cell, the power levels chosen in the sectors of a single radio cell may differ from each other.

Further, the transmission power levels and subcarrier block sets within a sector may be reconfigured as described above. The signaling that may be necessary to inform adjacent radio cells on the reconfiguration of a sector may be transmitted to the base stations providing the antenna beam of adjacent sectors of a sector cluster.

Another example for a possible power level-subcarrier block set combination is illustrated in FIG. 13. In this embodiment of the present invention, the sectors of a single radio cell do not use the same power level-subcarrier block set combination, as in the example of FIG. 12. The resulting "pattern" of coordinated power level-subcarrier block set combinations considered on a sector basis is similar to the one shown in FIG. 5. This means that a sector in FIG. 13 corresponds to a radio cell in FIG. 5 to abstain from the fact that more than one sector is controlled by a base station of a radio cell.

The ideas underlying the present invention may also be readily applied to MC-CDMA (Multi Carrier-CDMA) systems. When using a MC-CDMA system, the transmit power levels for a given SBS may be defined for the sum of the power-per-code for a given (sub)carrier-(block). Such a MC-CDMA system may employ spreading in time and/or frequency domain.

Further, it is noted that the principles underlying the present invention may be applicable to communication on the downlink and/or the uplink of a communication system.

The invention claimed is:

1. A base station apparatus configured to operate in a cell of a plurality of cells comprising:
   an allocation section that allocates a plurality of frequency blocks to each of a plurality of frequency block sets in the cell, wherein each of the plurality of frequency blocks comprises a plurality of subcarriers; and
   a setting section that sets a first transmission power level to one of the plurality of frequency block sets, the first transmission power level being different from a second transmission power level that is set to another frequency block set in the plurality of frequency block sets,
   wherein the setting section sets the first transmission power level to the one of the plurality of frequency block sets in the cell to be different from a third transmission power level set to a corresponding frequency block set in another cell of the plurality of cells.

2. The base station according to claim 1, wherein the allocation section allocates the frequency blocks to each of the frequency block sets in a non-consecutive fashion.

3. The base station according to claim 1, wherein the allocation section allocates the frequency blocks in predetermined intervals to each of the frequency block sets.

4. A method for a base station apparatus configured to operate in a cell of a plurality of cells, comprising the steps of:
   allocating, by a processor, a plurality of frequency blocks to each of a plurality of frequency block sets in the cell, wherein each of the plurality of frequency blocks comprises a plurality of subcarriers; and
   setting a first transmission power level to one of the plurality of frequency block sets, the first transmission power level being different from a second transmission power level that is set to another frequency block set in the plurality of frequency block sets;
   wherein the first transmission power level set to the one of the plurality of frequency block sets in the cell is different from a third transmission power level set to a corresponding frequency block set in another cell of the plurality of cells.

5. The method according to claim 4, wherein allocating the frequency blocks to each of the frequency block sets is performed in a non-consecutive fashion.

6. The method according to claim 4, wherein allocating the frequency blocks is performed in predetermined intervals to each of the frequency block sets.

\* \* \* \* \*